(12) United States Patent
Ramalho (10) Patent No.: US 7,602,817 B2
(45) Date of Patent: Oct. 13, 2009

(54) LOW DEVIATION FIELD MODULATION FOR TRANSFER OF INFORMATION

(75) Inventor: Michael A. Ramalho, Sarasota, FL (US)

(73) Assignee: Cisco Technology, Inc., San Jose, CA (US)

( * ) Notice: Subject to any disclaimer, the term of this patent is extended or adjusted under 35 U.S.C. 154(b) by 350 days.

(21) Appl. No.: 11/677,995

(22) Filed: Feb. 22, 2007

(65) Prior Publication Data
US 2008/0205400 A1  Aug. 28, 2008

(51) Int. Cl.
| | |
|---|---|
| H04J 3/12 | (2006.01) |
| G06F 7/04 | (2006.01) |
| G06F 15/16 | (2006.01) |
| G06F 17/30 | (2006.01) |
| H04L 9/32 | (2006.01) |
| H04N 7/16 | (2006.01) |
| H04L 9/00 | (2006.01) |
| H04J 3/06 | (2006.01) |

(52) U.S. Cl. .......................... 370/527; 380/268; 726/3; 726/30
(58) Field of Classification Search .................. 370/527; 380/268
See application file for complete search history.

(56) References Cited

U.S. PATENT DOCUMENTS 6,285,774 B1 *  9/2001  Schumann et al. .......... 382/100
7,058,815 B2 *  6/2006  Morin ........................ 713/180
7,124,442 B2 * 10/2006  Nash-Putnam ............... 726/26
7,415,018 B2 *  8/2008  Jones et al. .................. 370/392
2004/0083369 A1  4/2004  Erlingsson et al.

OTHER PUBLICATIONS

S. Zander, G. Armitage, P. Branch. Covert Channels in the IP Time To Live Field, Proceedings of The 2006 Australian Telecommunication Networks and Applications Conference, Dec. 2006, pp. 1-5.*
Haipeng Qu, Purui Su and Dengguo Feng, A Typical Noisy Covert Channel in the IP Protocol, 38th Annual International Conference on Security Technology, Oct. 14, 2004, pp. 189-192.*
E. Jones, O. Le Moigne, J. Robert, IP Traceback Solutions Based on Time to Live Covert Channel, 12th IEEE International Conference in Networks, Nov. 16, 2004, pp. 451-457.*
K. Ashan, Covert Channel Analysis and Data Hiding in TCP/IP, Masters Thesis, University of Toranto, pp. 1-134.*
Zander, Sebastian, et al., "Dynamics of the IP Time to Live Field in Internet Traffic Flows," CAIA Technical Report 070529A, May 2007, pp. 1-7.

(Continued)

*Primary Examiner*—Jayanti K Patel
*Assistant Examiner*—Christopher Crutchfield
(74) *Attorney, Agent, or Firm*—Weaver Austin Villeneuve & Sampson LLP (57) ABSTRACT

An interface receives a packet stream associated with a source and a destination. The packet stream includes multiple packets, each packet including a header and a payload. A system generates a modulated stream for inclusion in the packet stream and performs a low deviation modification to a header field in each of the multiple packets to include the modulated stream in the packet stream. The system then transmits the packet stream including the modulated stream.

20 Claims, 7 Drawing Sheets

OTHER PUBLICATIONS

PCT Notification of Transmittal of the International Search Report and The Written Opinion of the International Searching Authority, or the Declaration, mailed Mar. 23, 2009, Application No. PCT/US US2008/054650.

Zander, Sebastian, et al., "Covert Channels in the IP Time to Live Field," Australian Telecommunication Networks & Applications Conference (ATNAC), Australia, Dec. 2006, ISBN/ISSN 0977586103, XP-002517947, 5 pages.

Lucena, Norka, et al., "Covert Channels in IPv6," Privacy Enhancing Technologies Lecture Notes in Computer Science; LNCS, Springer Berlin DE, vol. 3856, Jan. 1, 2006, pp. 147-166.

Cauich, Enrique, et al., "Data Hiding in Identification and Offset IP Fields," Advanced Distributed Systems Lecture Notes in Computer Science; LNCS, Springer, Berlin, DE, vol. 3563, Jan. 1, 2005, pp. 118-125.

Danezia, George, "Covert Communications Despite Traffic Data Retention," Retrieved from Internet at: URL:http://web.archive.org/web/20060627195226/http://homes.esat.kuleuven.be/{gdanezis/cover.pdf> [originally retrieved on Mar. 5, 2009].

Qu, Haipeng, et al., "A typical Noisy Covert Channel in the IP Protocol," Security Technology, 2004, 38$^{th}$ Annual 2004 International Carnahan Conference on Albuquerque, NM, XP010776226, ISBN: 978-0-7803-8506-3, Oct. 11-14, 2004, pp. 189-192.

* cited by examiner

LOW DEVIATION FIELD MODULATION FOR TRANSFER OF INFORMATION

TECHNICAL FIELD

The present disclosure relates to low deviation field modulation for transfer of information.

DESCRIPTION OF RELATED ART

A source network device can use a variety of mechanisms to convey information to a destination network device. In some examples, a source device simply includes information in a packet payload or sends additional packets with information in the packet payload portions. In other particular examples, a source device encrypts information in a packet or provides an authentication sequence to provide cryptographic features for data transmissions. In some instances, additional fields convey information to a destination device.

However, mechanisms for conveying information from a source network device to a destination network device have limitations. Consequently, it is desirable to provide improved methods and apparatus for transferring information.

BRIEF DESCRIPTION OF THE DRAWINGS

The disclosure may best be understood by reference to the following description taken in conjunction with the accompanying drawings, which illustrate particular example embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular packet, packet header fields, and networks. However, it should be noted that the techniques of the present invention apply to a variety of packets, packet header fields, and a variety of different networks. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors can while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

An interface receives a packet stream associated with a source and a destination. The packet stream includes multiple packets, each packet including a header and a payload. A system generates a modulated stream for inclusion in the packet stream and performs a low deviation modification to a header field in each of the multiple packets to include the modulated stream in the packet stream. The system then transmits the packet stream including the modulated stream.

Example Embodiments

According to particular example embodiments, a network device modifies various quasi-static header fields in packet streams using low deviation code sequences in order to convey information to a destination network device. In one particular embodiment, a network device modifies a header field such as a Time-To-Live (TTL) field by +1 or −1 to carry information to a destination. Each packet carries this +1 or −1 value embedded in a header field such as a TTL field. The header field can carry a modulated stream unrelated to the intended purpose of the header field.

Network devices typically use a TTL field to prevent packets from lingering in a network ad infinitum. In one particular example, a source typically sets the TTL field in a packet to a particular value such as 64 and each network device along a path to the destination decrements the TTL. If the TTL reaches 0, a network device drops the packet. Various particular embodiments recognize that a header field such as a TTL field can be modified using a low deviation value such as +1, −1, +2, −2, etc. without adversely affecting the function of a TTL. By using a header field such as a TTL to carry information to a destination, the information can be obscured and hidden, as the TTL deviations would resemble network phenomena.

According to particular embodiments, modulation is relatively small. In particular examples, variations are as small as +1 or −1 from the original field value. Such a small dithering of the field would not cause adverse effects on network operation, since the TTL field is indicative of the layer 3 packet hops and the route a given packet can take can change packet to packet. However, such route changes rarely involve routes with grossly different hop counts.

The small modulations, e.g. +1, −1, 0, +2, −2, could be made to look random and innocent to existing mechanisms that happen to observe them. For example, if the modulation mean was zero and the observation mechanism only looked for an average value over a suitably large sampling interval, the observed average would yield the desired answer for an unmodulated stream.

Small modulations of the TTL field could take the form of a "dithering" or "spread spectrum" signal and be used either for the sending of low bit rate information or for watermarking purposes by careful design of the spread spectrum-like modulation. In particular watermarking application examples, a sender purposely watermarks the IP headers by a modulation value and possibly embeds information such as originator, date, time, content owner, etc. into the signal. If the packet stream is later recorded with the modulated field value, a subsequent analysis could determine that the stream came from or was copied from the original sender. The tracking of a watermarked stream may therefore have application for law enforcement agencies or other entities concerned with media ownership or digital rights management.

Many possible spreading codes can be used from the art of spread spectrum communications. In particular low-bit rate information transfer applications, the code used need not be secret. Due to packet discard/drops, a modulated stream may also carry error detection or correction codes to preserve the ability of the destination device to decode the information embedded in the stream.

Various particular embodiments recognize that most paths for a stream between a source and a destination are relatively stable, at least for notable periods of time. Some paths may include load balancers that send traffic along different paths. However, many of these load balanced paths still have the same number of hops and result in the same TTL at a destination. Consequently, a stream typically should have the same TTL at least for set periods of time or local time periods. According to particular example embodiments, variations to the TTL in the form of low deviation values can be used to convey information that authenticates a stream, e.g. checks the identify of a source device, verifies that a stream is valid, etc. In particular example embodiments, the low deviation values can embed watermarks or authentication information. Network snoopers would not be privy to the use of a particular field to carry this information. Even if payloads are copied exactly, spreading codes carried in header fields would likely remain hidden.

At certain points in time, a network topology may change and the resulting TTL for a stream from a source to a destination may change. However, various particular embodiments recognize that a destination device can detect network topology changes by recognizing average TTL changes. If the modulated stream included in a packet stream has an average of 0, a destination device can still extract the modulated stream by recognizing variations from the stepped up or stepped down TTL.

Although particular embodiments are being described in the context of TTL for clarity purposes, it should be recognized that a variety of packet header fields in a variety of different packet formats can be used. In particular example embodiments, Real-time Transport Protocol packets include contributing source fields that could be used to include a modulated stream. According to particular example embodiments, some header fields such as the TTL field are particularly suited for carrying a modulated stream encoded using low deviation values.

Figure 1:
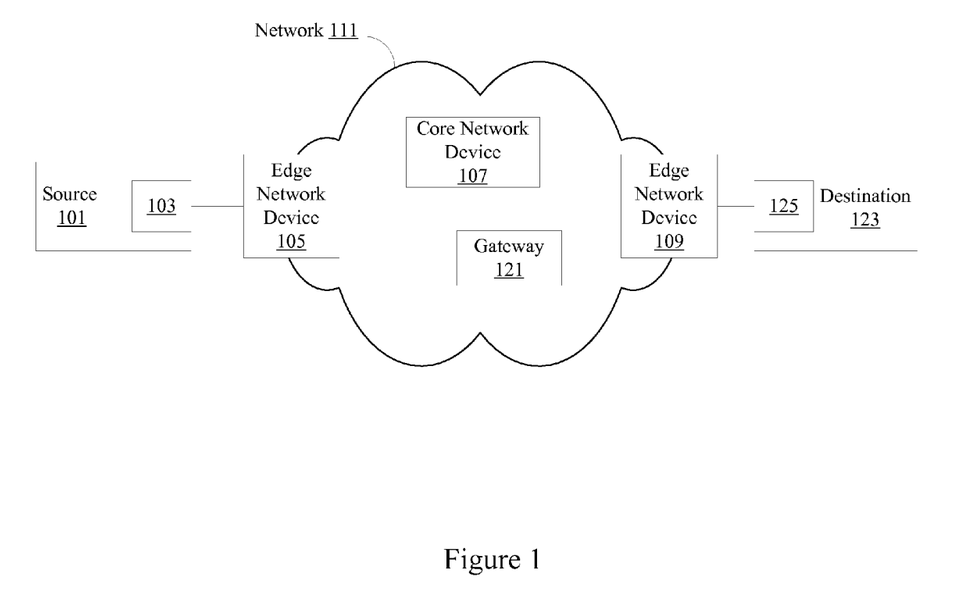
FIG. 1 illustrates a particular example of a network.

FIG. 1 illustrates a particular example of a network that can use particular example embodiments. A source 101 is connected to an edge network device 105 through interface 103. According to particular example embodiments, the source 101 is a client, mobile device, server, terminal, or any other source of data. The edge network device 105 is included in network 111. In particular example embodiments, network 111 is a cell and/or packet based network including multiple subnetworks supporting one or more protocols such as the Internet Protocol (IP) and the Real-Time Transport Protocol (RTP). Packets transmitted in network 111 may have headers such as IP, User Datagram Protocol (UDP), Transmission Control Protocol (TCP), Stream Control Transmission Protocol (SCTP), or other cell/packet headers. Network 111 also includes core network device 107, gateway 121, edge network device 109, as well as variety of other switches, routers, and devices. Destination 123 is connected to edge network device 109 through interface 125.

According to particular example embodiments, any device that receives a packet stream can perform packet header modulation to transfer information such as watermark, identification, or other information. In some embodiments, a source 101 or a source interface 103 modulates packet header information by performing low value modifications to allow the transfer of low bit rate information to a destination 123. In other examples, an edge network device 105 performs packet header modulation on all packets in a particular stream. In still other examples, a core network device 107 or a gateway 121 performs packet modulation to insert a modulated stream into a packet stream. In particular embodiments, a destination 123 extracts the modulated stream from the packet stream. In other examples, a network device such as an edge network device 109 extracts and decodes the modulated stream. In particular examples, the modulated stream is a sequence of +1/−1 values added to a stream of TTL header values. In a network where paths are relatively stable or path lengths are relative stable, the modulated stream of +1/−1 values can be extracted to ascertain information such as watermark information or identification information.

Figure 2:
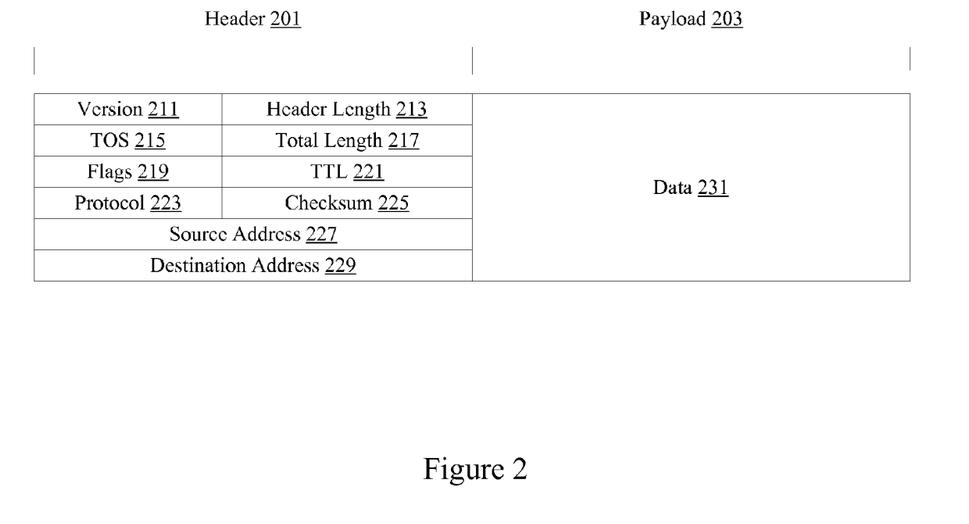
FIG. 2 illustrates a particular example of a packet.

FIG. 2 illustrates a particular example of a packet that has headers that can carry a modulated stream. According to particular example embodiments, the packet includes header 201 and payload 203. A system may also use other fields to hold modulated stream information. Header 201 includes version 211. In particular example embodiments, the version 211 specifies the format of a header such as an IP header. The header length 213 specifies the length of the IP packet header in 32 bit words. Type of Service (TOS) 215 specifies the parameters for the type of service requested. Networks can use the parameters to configure handling of the datagram during transport. Total length 217 specifies the total length of the packet in 32 bit words. In particular example embodiments, flags 219 indicate if the packet can be fragmented. Source address 227 specifies a source device address and destination address 229 specifies a destination device address.

In particular example embodiments, protocol 223 specifics an encapsulated protocol. Checksum 225 provides error correction/detection for the packet header 201 and/or the data 231 in packet payload 203. TTL 221 is a counter timer field used to track the lifetime of the packet. When the TTL field is decremented to zero, the datagram is typically discarded.

According to particular example embodiments, the TTL field 221 is particularly suitable for carrying a modulated stream because slight alterations to the field do not adversely impact network operation and the TTL 221 is typically transmitted in clear text. On the other hand, slight modifications to other fields such as a version 211 may significantly impact network operation. For example, changing a version 211 to a version unsupported by a particular device may lead to packet drops. Slight modifications to the TTL 221, however, usually have no impact on packet transmission and in the worst case may cause a packet to be dropped slightly early or late. However, TTL 221 is usually set somewhat arbitrarily anyway by a source application, so slight variations do not have much impact. Even though the TTL 221 field is particularly suited for carrying a modulated stream, other header fields and optional fields can be used as well. Some RTP fields are also particularly suited for carrying modulated streams.

Figure 3:
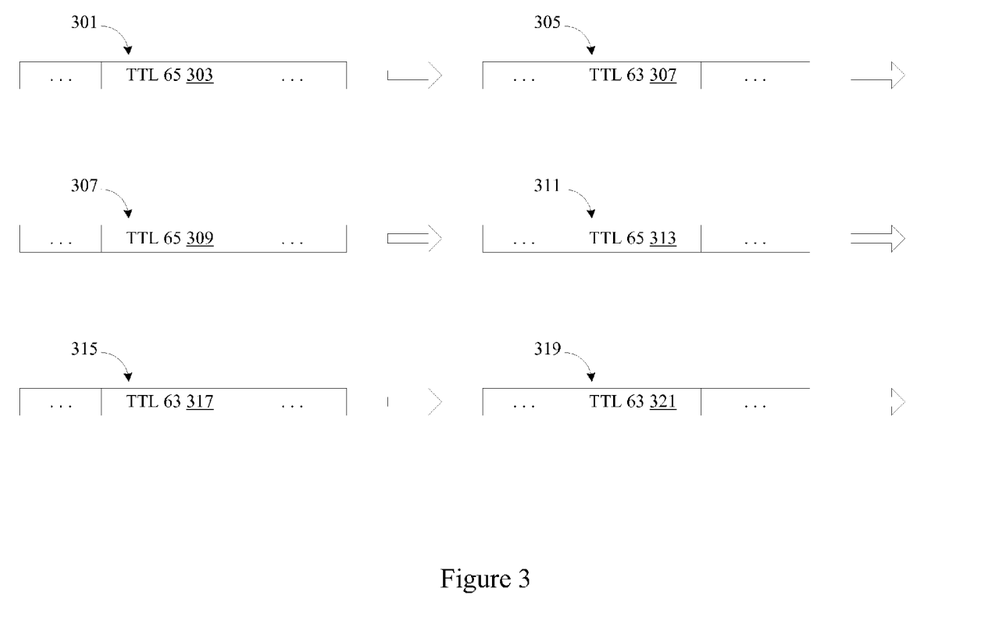
FIG. 3 illustrates a particular example of a packet stream having modified headers.

FIG. 3 illustrates one example of a packet stream. According to particular example embodiments, the packet stream includes packets 301, 305, 307, 311, 315, and 319. A source application sets the TTL for the packets to 64. In particular example embodiments, packets will be dropped after traveling 64 hops. This prevents packets from perpetually lingering in a network. Setting a TTL too high allows many packets to linger while setting a TTL too low leads to premature drops. According to particular example embodiments, a modulated stream is included in a packet stream by modifying TTL values slightly. In particular embodiments, a stream +1, −1, +1, +1, −1, −1 is included in a packet stream by modifying the TTL values to 65, 63, 65, 65, 63, 63.

In many networks, path lengths are relative stable, or at least stable for set periods of time. In particular embodiments, the path length is 20 from a source to a destination. The TTL values at the destination would be 45, 43, 45, 45, 43, 43. Since the path is generally stable, a destination device receiving the TTL values would be able to extract the modulated stream +1, −1, +1, +1, −1, −1. It should be appreciated that a variety of techniques including spread spectrum techniques can be used to generate a modulated stream.

In particular example embodiments, a code or key may be known in advance by a source and a destination. The modulated stream would be made to appear as random and as "noise-like" as possible, but still be reproducible. Consequently, the sequence is nearly random. In some examples, a feedback shift register is used to generate pseudo-random codes. In other examples, the modulated stream is an encrypted stream that could not be accessed even if detected by an outside party. Key exchange could be performed using the modulated stream or some other mechanism. In some instances, key exchange is performed using normal packets with data transfer included in the payloads but verification information may be carried in a modulated stream in header fields.

Figure 4:
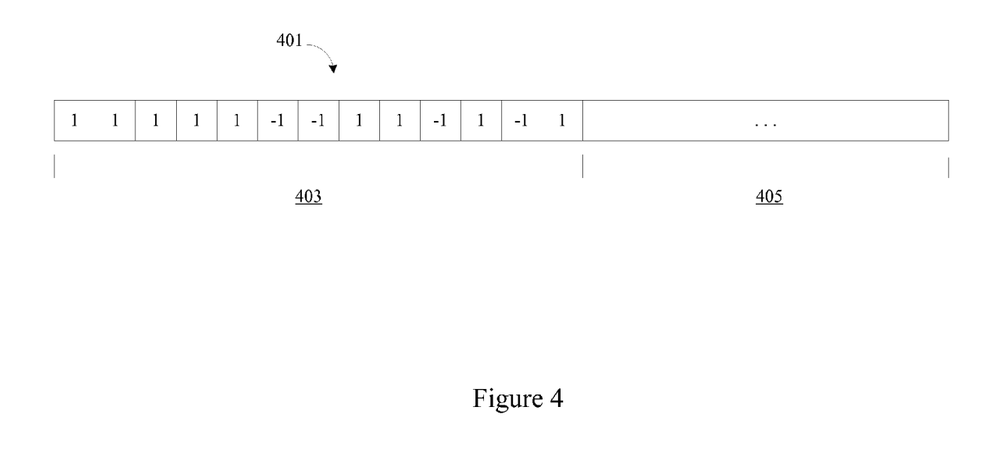
FIG. 4 illustrates a particular example of modulation stream.

FIG. 4 illustrates one example of a modulated stream. According to particular example embodiments, a modulated stream 401 includes synchronization bits 403 as well as data bits 405. In particular example embodiments, synchronization bits such as Barker codes are used to identify the start of a data sequence to a destination. Synchronization bits such as Barker codes are typically selected for their autocorrelation properties. Autocorrelation is typically a measure of how well a signal matches a time-shifted version of itself. Synchronization bits are typically selected for low autocorrelation.

One 18-bit Barker code sequence is +1, +1, +1, +1, +1, −1, −1, +1, +1, −1, +1, −1, +1. Some other examples of Barker codes are +1, −1 and +1, +1 for two bit sequences, +1, +1, −1 for three bit sequences, and +1, −1, +1, +1 and +1, −1, −1, −1, for four bit sequences. Some longer examples of Barker codes sequences include +1, +1, +1, −1, +1 for five bit sequences, +1, +1, +1, −1, −1, +1, −1 for seven bit sequences, +1, +1, +1, −1, −1, −1, +1, −1, −1, +1, −1 for eleven bit sequences, and +1, +1, +1, +1, +1, −1, −1, +1, +1, −1, +1, −1, +1 for thirteen bit sequences. Autocorrelation is also useful for finding repeating patterns in a signal so that a destination can possibly detect a modulated stream even if there is no prior notification.

According to particular example embodiments, error correction codes and error checking codes are also included in a modulated stream. In particular example embodiments, error correction codes and error checking codes allow a destination to decode a modulated stream despite packet drops.

It should be noted that a modulated stream typically includes only small variations or small deviations. It is possible to include large values in a modulated stream. Using large values allows modified header fields to potentially carry more information. For example, an 8-bit value could be added to each header field. Each packet would hold an 8-bit value instead of a one bit value. However, modifying a header field by a large value is more likely to adversely impact system operation. For example, adding a large value to a version number or a large value to a TTL can render the header field useless. Adding a large value to a TTL may allow many packets to linger in a network. Furthermore, adding large values is more likely to allow a snooper to identify that a modulated stream is present. Small deviation modulated streams can remain undetected and unobstructive.

Figure 5:
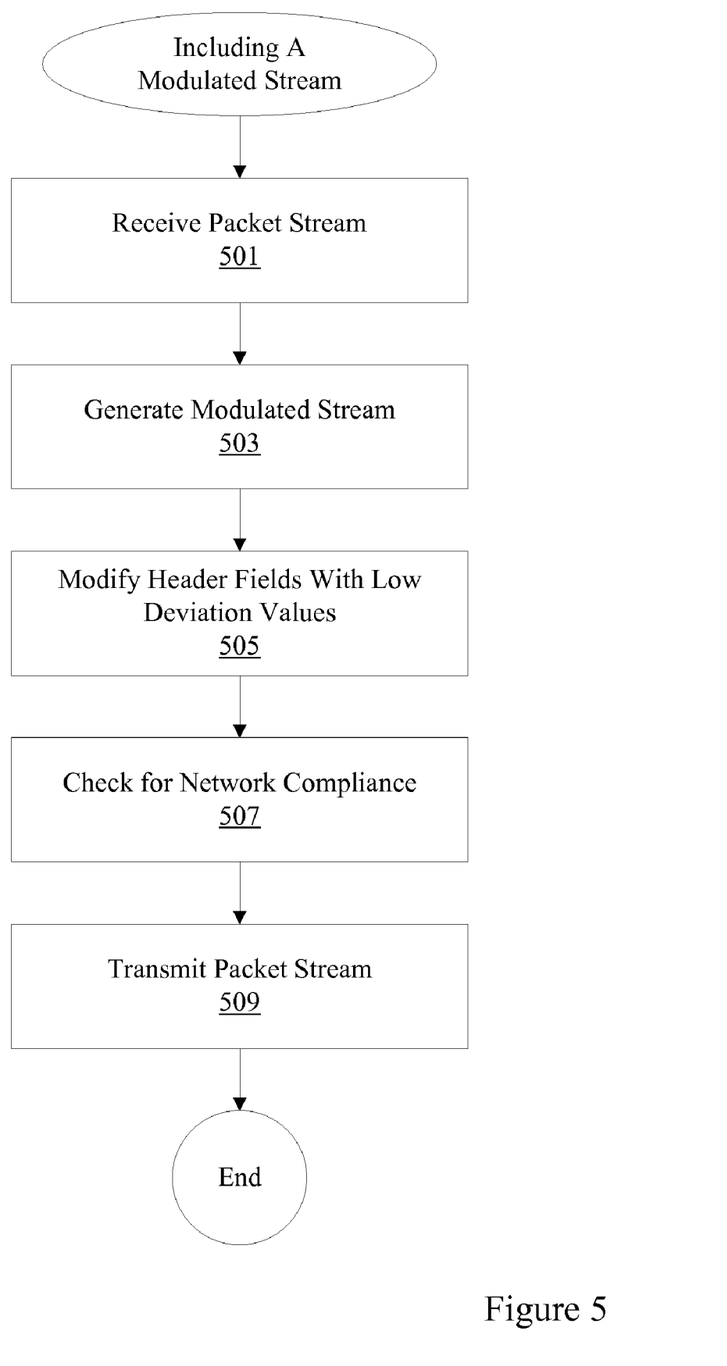
FIG. 5 illustrates a particular example of a technique for including a modulated stream in a packet stream.

FIG. 5 illustrates a technique for transmitting a packet stream including a modulated stream. At 501, a mechanism receives a packet stream. In particular example embodiments, a system, a line card, a device, and/or a processor receives a packet stream. According to particular example embodiments, a system identifies the packet stream using source and destination pairs. A variety of entities including a variety of applications and devices may be the source of a packet stream. Although a system receives a packet stream, other streams such as cell based streams may also apply. In one example, an interface receives the packet stream. In another example, a device or processor receives the packet stream.

At 503, a modulated stream is generated. According to particular example embodiments, the modulated stream includes synchronization codes, error correction codes, as well as encrypted data placed onto a stream using spread spectrum codes. A portion or the entirety of the modulated stream may also be encrypted and authenticated. In particular example embodiments, the modulated stream has low deviation values, such as +1/−1 or +2/−2. Low deviation values used to modify particular header fields such as TTL do not adversely impact system performance. Low deviation values can also be transmitted as secret modulations that look random and innocent to mechanisms that happen to observe them.

At 505, header fields are modified using low deviation values. According to particular example embodiments, the TTL is modified using low deviation values provided by the modulated stream. If the intended TTL for all packets transmitted by the source is 128, the modified TTL header values transmitted would be 127 and 129. At 507, the system performs a check for network compliance. According to particular example embodiments, the check determines if the packet including modified packet headers is in compliance with a particular protocol. In particular example embodiments, a system performs a check to verify that the TTL does not exceed a max network supported TTL. At 509, the packet stream is transmitted. According to particular example embodiments, the packet stream is transmitted with a modulated stream embedded in header fields.

Figure 6:
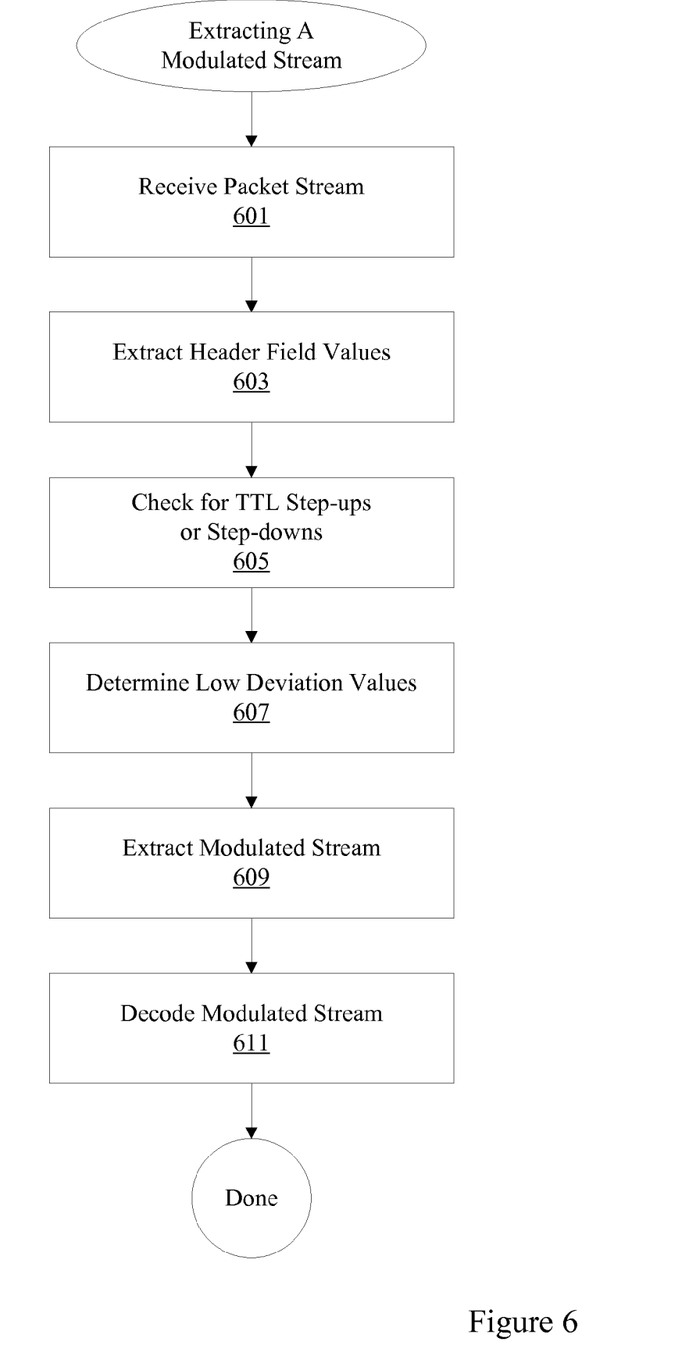
FIG. 6 illustrates a particular example of a technique for extracting a modulated stream from a packet stream.

FIG. 6 illustrates a technique for receiving a packet stream and a modulated stream. At 601, a packet stream is received. According to particular example embodiments, the packet stream is designated using source destination pairs. The destination device receiving the packet stream may know that a packet stream having a modulated stream is being sent. Alternatively, the destination device may check all streams for possible modulated streams. In some examples, the destination device checks for Barker codes or other synchronization codes to determine if a modulated stream is present in the packet stream. At 603, the device extracts header field values if a modulated stream is present. In some examples, a variety of header field values are extracted. According to particular example embodiments, the TTL values are extracted. In some example embodiments, more than one header field in a packet is used to hold modulated stream information.

At 605, assuming the TTL values are extracted, a system checks for TTL step-ups and step-downs. That is, the system checks for periods when network topology changes and a path length changes upwardly or downwardly. It is recognized that received TTL values change most frequently when network topology changes. These periodic events lead to a stable shift in path lengths and consequently received TTL values. In some instances, the path lengths may change dramatically.

For example, if TTL values received are 63, 65, 65, 63, 63, 65, and suddenly switch to 53, 55, 55, 55, 53, 53, a step down of 10 would be considered. Similarly, if TTL values switched to 67, 69, 69, 67, 67, 69 a step up of four would be considered. In particular example embodiments, a system only considers the variation from a local mean. It is recognized that after a network topology change, path lengths stabilize. At 607, low deviation values such as a low deviation bit stream are determined. At 607, the system extracts a modulated bit stream and at 611, the system decodes the modulated bit stream. The modulated bit stream may correspond to a watermark for a particular user. In particular embodiments, the modulated bit stream is a key for digital rights management. A destination application is operable to play only data from the payloads of packets associated with a particular watermarked stream. Files sent from other devices would not be played. A snooper obtaining a stream of media data may not detect the modulated stream and consequently may not obtain the TTL header values. Consequently, even if the snooper retransmits the data, a destination application player may not play the media data as no appropriate watermark would be detected by a media player.

Figure 7:
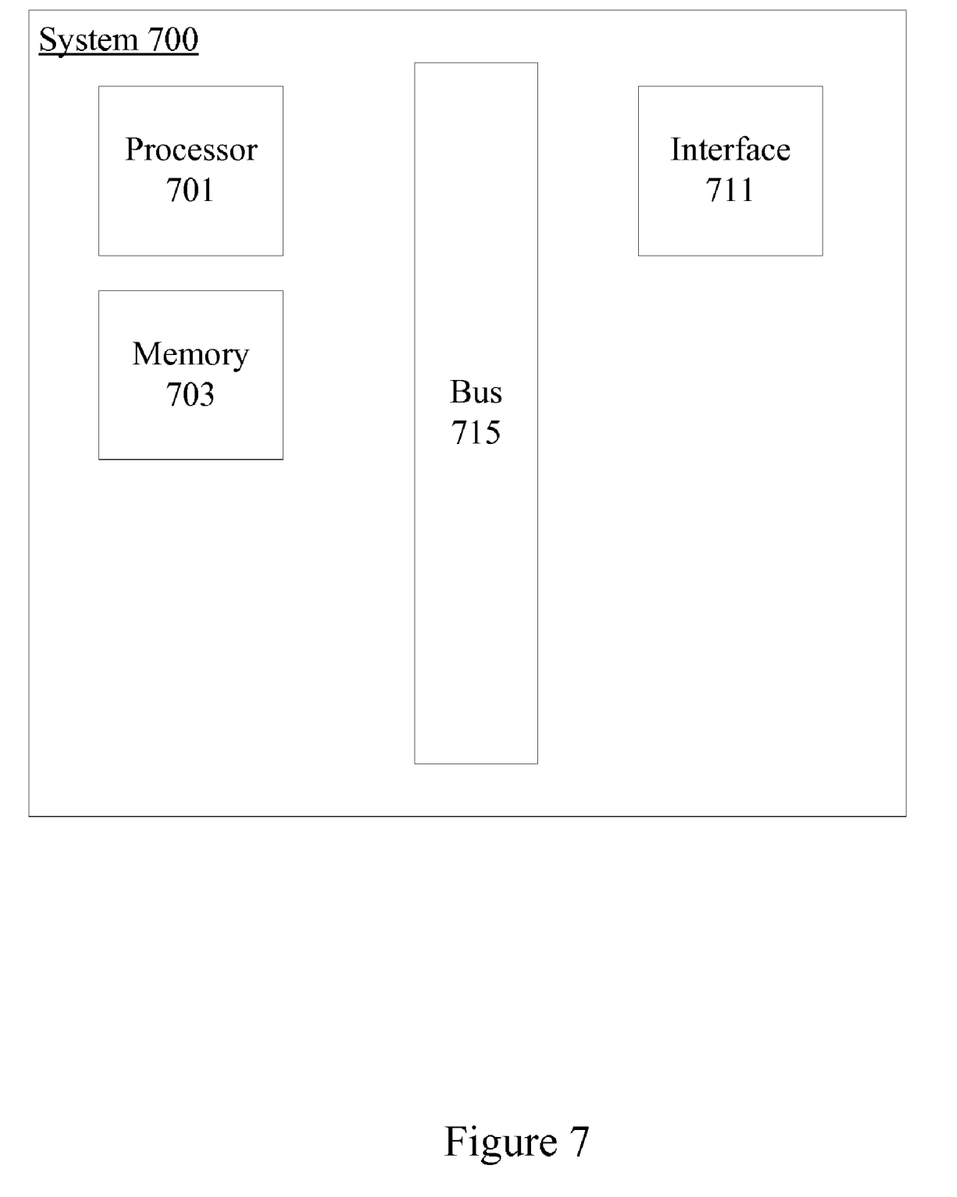
FIG. 7 illustrates a particular example of a network device.

A variety of devices and applications can use particular examples of modulated streams. Server, routers, switches, line cards, can all use modulated streams. FIG. 7 illustrates one example of a device that can use a modulated stream.

According to particular example embodiments, a system 700 suitable for implementing particular embodiments of the present invention includes a processor 701, a memory 703, an interface 711, and a bus 715 (e.g., a PCI bus). When acting under the control of appropriate software or firmware, the processor 701 is responsible for such tasks such as encoding and decoding modulated streams. Various specially configured devices can also be used in place of a processor 701 or in addition to processor 701. The interface 711 is typically configured to send and/or receive data packets or data segments over a network. Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 700 uses memory 703 to store data and program instructions. The program instructions may control the operation of an operating system and/or one or more applications, for example. The memory or memories may also be configured to store received packets, bindings, Keep-Alive states, periodicity information for monitored session packets, Flow-Through and/or Flow-Around configurations, etc.

Because such information and program instructions may be employed to implement the systems/methods described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
receiving a packet stream associated with a source and a destination, the packet stream including a plurality of packets, each of the plurality of packets including a header and a payload;
generating a modulated stream for inclusion in the packet stream, wherein the modulated stream has an average value of 0;
performing a low deviation modification to a time-to-live (TTL) header field in each of the plurality of packets to include the modulated stream in the packet stream;
transmitting the packet stream including the modulated stream, wherein the destination recognizes network topology changes by determining whether the average value of the modulated stream has changed.

2. The method of claim 1, wherein the modulated stream is used to watermark the packet stream.

3. The method of claim 1, wherein the modulated stream is used to embed low-bit rate information in the stream.

4. The method of claim 1, wherein the low deviation modification is the variation of the header field by +1/−1.

5. The method of claim 1, wherein the modulated stream is generated using spread spectrum codes.

6. The method of claim 5, wherein using spread spectrum codes comprises using spread spectrum modulation for generating the modulated stream.

7. The method of claim 1, wherein generating the modulated stream comprises using dithering.

8. The method of claim 1, wherein the mean of the low deviation modification to the header field in each of the plurality of packets is 0.

9. The method of claim 1, wherein the modulated stream is used by the destination to verify the identity of the source.

10. An apparatus, comprising:
an interface operable to receive a packet stream associated with a source and a destination, the packet stream including a plurality of packets, each of the plurality of packets including a header and a payload;
a processor operable to generate a modulated stream for inclusion in the packet stream and perform a low deviation modification to a time-to-live (TTL) header field in each of the plurality of packets to include the modulated stream in the packet stream, wherein the modulated stream has an average value of 0;
wherein the interface is further operable to transmit the packet stream including the modulated stream to the destination, wherein the destination recognizes network topology changes by determining whether the average value of the modulated stream has changed.

11. The apparatus of claim 10, wherein the modulated stream is used to watermark the packet stream.

12. The apparatus of claim 10, wherein the modulated stream is used to embed low-bit rate information in the stream.

13. The apparatus of claim 10, wherein the low deviation modification is the variation of the header field by +1/−1.

14. The apparatus of claim 10, wherein the modulated stream is generated using spread spectrum codes.

15. The apparatus of claim 14, wherein using spread spectrum codes comprises using spread spectrum modulation for generating the modulated stream.

16. The apparatus of claim 10, wherein the mean of the low deviation modification to the header field in each of the plurality of packets is 0.

17. The apparatus of claim 10, wherein the modulated stream is used by the destination to verify the identity of the source.

18. A system, comprising:
means for receiving a packet stream associated with a source and a destination, the packet stream including a plurality of packets, each of the plurality of packets including a header and a payload;
means for generating a modulated stream for inclusion in the packet stream, wherein the modulated stream has an average value of 0;
means for performing a low deviation modification to a time-to-live (TTL) header field in each of the plurality of packets to include the modulated stream in the packet stream;
means for transmitting the packet stream including the modulated stream, wherein the destination recognizes network topology changes by determining whether the average value of the modulated stream has changed.

19. A Digital Rights Management (DRM) system, comprising:
a media source operable to generate a media stream including a plurality of media packets, each of the plurality of media packets having a header and a payload, the media source operable to transmit the media stream;
a destination operable to receive the media stream and extract a modulated stream by determining low deviation modifications to a header field in each of the plurality of media packets, wherein the modulated stream provides the destination with information to authenticate the media stream, wherein the destination recognizes topology changes by determining whether the average value of the modulated stream has changed, wherein the modulated stream has an average value of 0.

20. The Digital Rights Management (DRM) system of claim 19, wherein the destination extracts a modulated stream by determining low deviation modifications to the time-to-live (TTL) field in each of the plurality of media packets.

* * * * *